INVENTORS
EUGENE G. DOMICH
ROBERT R. REISINGER
BY
Kenway, Jenney & Hildreth
ATTORNEYS INVENTORS
EUGENE G. DOMICH
ROBERT R. REISINGER
BY *Kenway, Jenney & Hildreth*
ATTORNEYS INVENTORS
EUGENE G. DOMICH
ROBERT R. REISINGER
BY
Kenway, Jenney & Hildreth
ATTORNEYS INVENTORS
EUGENE G. DOMICH
ROBERT R. REISINGER
BY
Kenway, Jenney & Hildreth
ATTORNEYS United States Patent Office 3,298,009
Patented Jan. 10, 1967

3,298,009

HEAD MOUNTING AND POSITIONING APPARATUS FOR RANDOM ACCESS DISC MEMORY SYSTEMS

Eugene G. Domich, Rosemont, and Robert R. Reisinger, Mahtomedi, Minn., assignors to ANelex Corporation, Boston, Mass., a corporation of New Hampshire Filed Apr. 17, 1963, Ser. No. 273,597
10 Claims. (Cl. 340—174.1)

Our invention relates to random access memory systems, particularly to an improved head mounting and positioning system for random access magnetic disc file storage systems.

Considerable attention has been directed in recent years to the development of high capacity memory systems for computers, control systems, data processing systems, and the like. The requirements of the art now dictate not only increasingly large information capacities for memory systems, but increasingly short access times for storing or retrieving a particular item of information stored.

One promising approach to the storage problem has been to record information on the magnetically coated surface of a disc by means of transducer heads which read or write digital information on the surface. The storage capacity of information storage units of this kind is directly related to the accuracy with which the transducer heads can be positioned to a particular track location on the recording surface of a disc, because it is necessary to allow a large enough space between tracks to allow for any positioning errors which may occur. Moreover, the capacity of such systems is limited by the signal-to-noise ratio of the signals obtained after writing on and retrieval from the surface. It is the object of our invention to greatly improve the accuracy with which heads can be positioned on a recording surface, and to enhance the signal-to-noise ratio of information stored on such surfaces.

Our invention is particularly applicable to random access storage systems in which a file of recording discs is mounted on a shaft for rotation about a fixed axis, and transducer heads are moved along the surfaces of the discs to prescribed locations for information storage and retrieval. In the past, it has been common to mount transcription arms carrying transducer heads for rotation about an axis parallel to the axis of rotation of the discs, the arms swinging in an arc which carries the heads over selected radially displaced tracks on the discs. In accordance with our invention, however, we prefer to mount the heads on arms which are moved radially toward or away from the centers of the discs, thus making the displacement of each head radially of the disc surface linear in the displacement of the transcription arm on which it is mounted. Preferably, a plurality of arms are secured to a common bracket slidably mounted on a support, and means are provided for actuating the bracket to any one of a preselected number of positions for storing or retrieving a particular item of information on a selected disc surface. Means are provided for retracting the heads from their operating positions, by a novel and effective mechanism for simultaneously and positively retracting all heads to a safe distance from the disc surfaces. By this arrangement, it is possible to avoid proximity of the heads to the discs when the discs are not in motion at sufficient speed to support the heads by aerodynamic action.

Our invention will best be understood by reference to the following detail description, together with the accompanying drawings, of a preferred embodiment of our invention.

Figure 1:
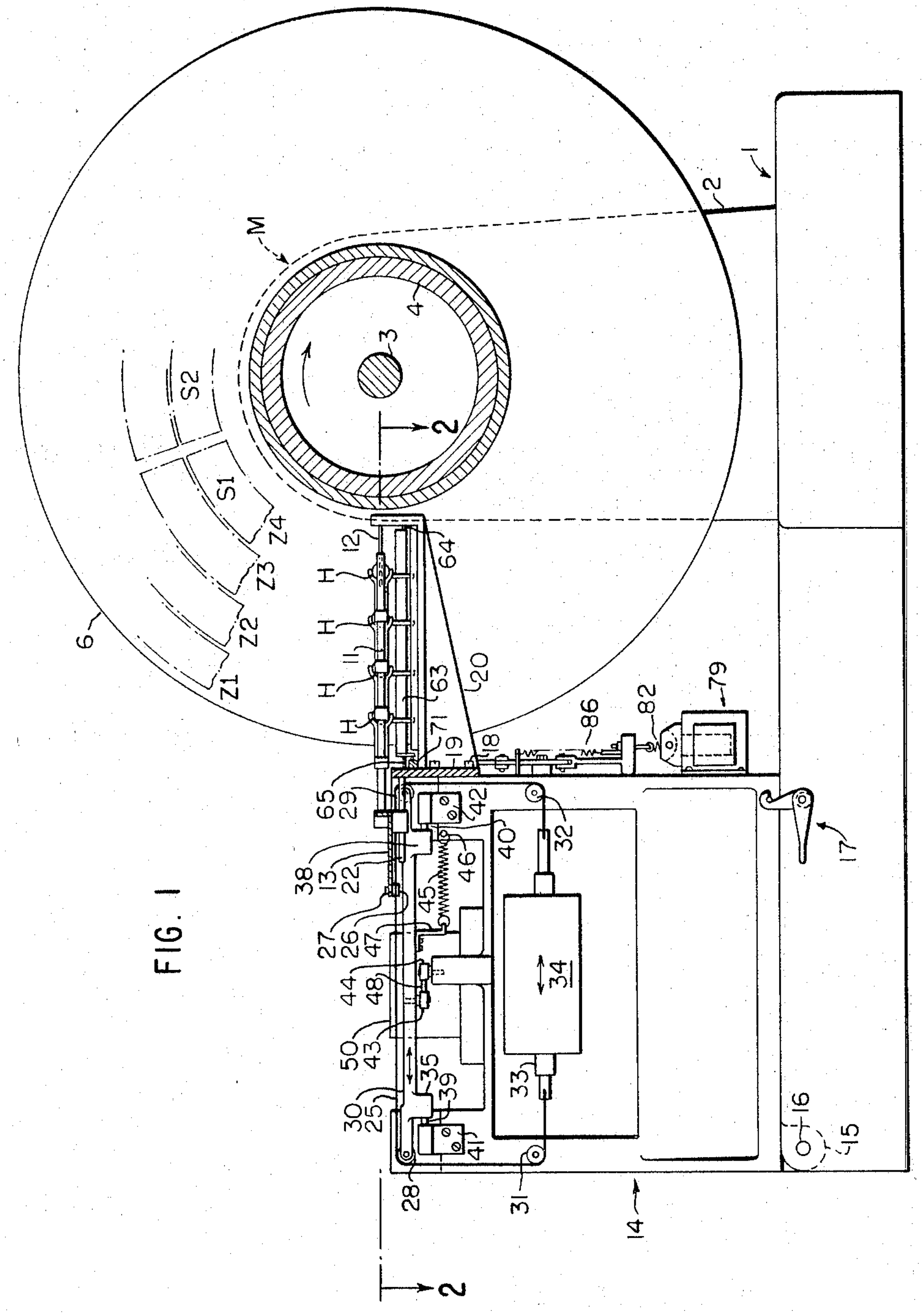
FIG. 1 is an elevational view, with parts shown in cross-section and parts broken away, of a random access disc memory system incorporating the novel head mounting and positioning apparatus of our invention.

Referring to FIG. 1, we have shown a random access disc memory unit provided with a suitable base 1 consisting of a suitably formed metal casting. On the base 1 is mounted a pedestal 2, the upper portion of which is formed integral with the housing of a motor generally designated at M, and having a drive shaft 3. The shaft 3 is formed integral with or otherwise fixedly attached to an outer concentric drive shaft 4, as by an end flange 5 as suggested in FIG. 2. In operation, the shafts 3 and 4 are rotated together at constant speed in the direction indicated by the arrow.

Figure 2:
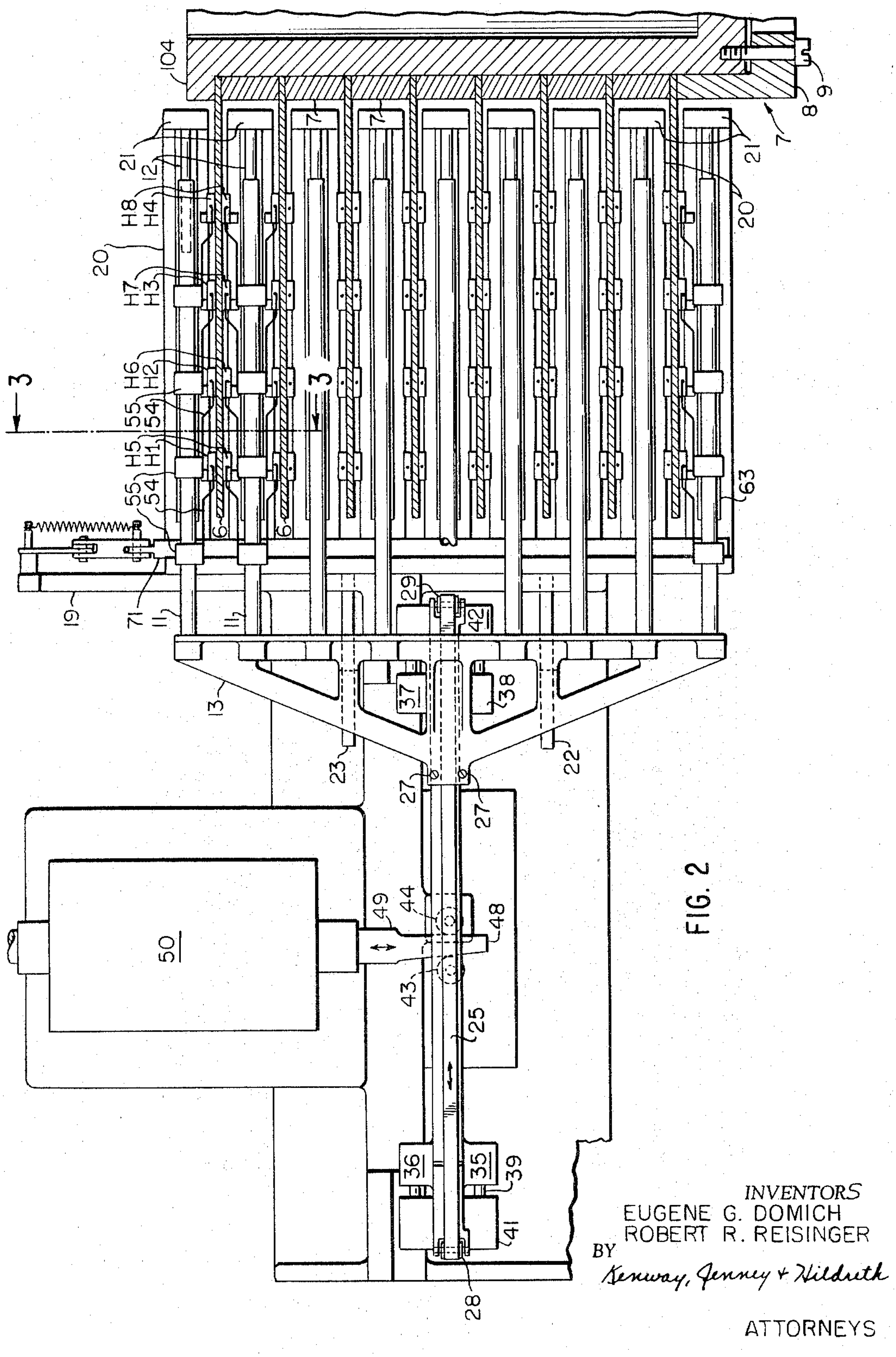
FIG. 2 is a plan view on an enlarged scale of a portion of the apparatus of FIG. 1, taken essentially along the lines 2—2 in FIG. 1.

As shown in FIGS. 1 and 2, a plurality of magnetic recording discs 6 are mounted on the shaft 4 for rotation about their central axes, and are spaced apart by a series of clamping rings 7. As shown in FIG. 2, the end clamping ring 7 is provided with an end flange portion 8 which is apertured to receiving clamping bolts such as 9, cooperating with threaded recesses formed in the shaft 4 to clamp the discs and clamping rings 7 firmly together against an end flange portion 10 on the shaft 4.

Each of the discs 6 is coated on both sides with a suitable magnetic recording material, such as iron oxide or the like. The body of the discs may be made of any suitable material, such as magnesium or the like. As indicated in FIG. 2, each disc is associated with eight cooperating magnetic transducer heads H, four on each side of the disc.

As indicated in FIG. 1, the surfaces of each disc 6 are divided into storage areas which may be individually addressed to retrieve particular items of information. While this division may be carried out in any desired manner, as illustrated, the recording surface is divided into four displaced bands or zones Z1, Z2, Z3 and Z4. Each zone may further be divided into sectors, such as S1 and S2. In practice, it has been found convenient to provide any number of sectors, from one to thirty-two or even more, depending on the size of the discs. Within each zone and sector, and not shown in FIG. 1, may be located a selected number of radially displaced recording tracks on which information is magnetically written. In practice, we have found it convenient to provide 100 such tracks in each sector. Each of these tracks may be termed a record. Each of the heads H is adapted to read, write and erase information in a particular zone. Thus, a particular record may be addressed by selecting the proper track, disc, head and sector. Location of the head in a given sector in a given time may be indicated by any suitable conventional means, not shown, as by a transducer mounted on the shaft of the motor M and generating suitable signals corresponding to the angle between a reference radius on the discs and the line along which the heads are located. It will be apparent that by moving all heads in unison radially of the discs over a range equal to the width of one zone, any record on the discs may be located. In order to utilize as many tracks as possible, it is highly important that the heads be positioned with great accuracy. For this purpose, as shown in FIG. 2, each of the heads H is mounted on an arm 11. As indicated in FIG. 2, the arms 11 are tubular and are slidably guided and supported at one end by rods 12 which are slidably received within their openings. At their other ends, the arms 11 are secured to or formed integral with a suitable bracket 13, whereby the arms are secured together to move in unison.

The bracket 13 is slidably mounted on a head positioner support 14 for lateral movement of the discs 6 in a manner to be described below.

Referring now to FIG. 1, the positioner support 14, which may be in the form of a suitable casting shaped to receive the parts to be described, is pivotly mounted on the base 1 by means of lugs 15, depending from the bottom of the support 14, and a shaft 16, secured in the base. The positioner support is secured to the base by a manually actuable latch 17, which may be released when desired to allow the entire positioner support to be swung up for cleaning and servicing of the transducer heads.

Mounted on the positioner support 14, by suitable means such as the bolts 18, is a spoiler support plate 19. A series of spoilers 20 are formed integrally with the support plate 19, and extend between the discs in the manner shown in FIG. 2. The structure and function of these spoilers is the subject of our copending U.S. application Serial No. 273,613 for Temperature and Pressure Stabilizing Apparatus for Random Access Disc Memory Systems, filed April 17, 1963, now U.S. Patent No. 3,258,756 and assigned to the assignee of our invention. For the purposes of understanding our invention, these spoilers may simply be regarded as firm supports for the head positioning apparatus.

Each of the spoilers 20 is formed at its outer end with an upstanding ledge 21, to which the support rods 12 for the arms 11 are fixedly attached. Secured to the back side of the spoiler support plate 19 are a pair of support rods 22 and 23, on which the bracket 13 is slidably supported by means of protruding lugs such as 24 on the bracket, apertured to receive the rods 22 and 23. Thus, the bracket 13 and the attached arms 11 are slidably supported at one end by the rods 12, and at the other by the rods 22 and 23.

The bracket 13 is connected to a tape 25, of stainless steel or the like, by suitable means such as the plate 26 and the bolts 27. The tape 25 passes around a pair of rolls 28 and 29, which are journalled on and carried by an arm 30, the arm 30 being slidably mounted on the positioner support 14, in a manner to be described. The tape 25 also passes over a pair of fixed rolls 31 and 32, which are journalled on the positioner support 14.

The ends of the tape 25 are secured to the opposite ends of a positioning shaft 33 of a coarse digital positioner 34. The positioner 34 may be made in the manner shown and described in U.S. Patent No. 2,054,806 to E. S. Bush, granted September 22, 1936 for Electromagnetic Control Device, in accordance with the embodiment shown in FIG. 4 of the Bush patent. Preferably, the positioner is constructed to have ten discrete positions a fixed distance apart. As shown in the Bush patent, each of these positions may be selected by energizing a pair of leads to energize an appropriately located coil to attract the armature of the positioner to the selected location.

Referring to FIG. 1 of our drawings, the shaft 33 would be connected to the armature of the positioner, so that it could be moved to any one of its ten positions by energization of the appropriate pair of leads. Preferably, rather than the mechanical switching means shown by Bush, an electrical or electronic switching means would be used to select the proper pair of leads for energization. For example, each of ten input wires defining one of ten coarse positions could be connected to energize one of ten selecting relays, the relays being provided with contacts connected to complete the necessary connections to a suitable power supply. Other means of performing the same function will readily occur to those skilled in the art.

The frame of the coarse positioner 34 is secured, as by bolts or the like, to the positioner support 14. Accordingly, by actuating the positioner to any one of its ten selected positions, the tape 25 will move the bracket 13, arms 11 and heads H to any one of ten selected positions.

In order to increase the number of positions to which the arms 11 can be moved, provision is made for lateral movement of the arm 30 carrying the rolls 28 and 29 to any one of a selected number, such as ten in one practical embodiment, of selected positions. For this purpose, the arm 30 is provided with a first pair of depending lugs 35 and 36 at one end, and a second pair of depending lugs 37 and 38 at the other end. These lugs are apertured to slidably receive support rods such as 39 and 40. The rods such as 39 and 40 are mounted in brackets such as 41 and 42, bolted to the positioning support 14. It will be apparent that by this arrangement, the arm 30 may be translated laterally to move the bracket 13 without movement of the output arm 33 of the positioner 34.

As shown in FIGS. 1 and 2, a first roller 43 is journalled on the arm 30 for rotation about a vertical axis. A second roller 44 is journalled in the positioner support 14 for rotation about a parallel axis. The arm 30 is urged toward the right in FIG. 1 by a spring 45, connected between a pin 46, secured to the positioning support 14, and a bracket 47, connected to the positioning arm 30. Thus, the roller 43 is urged toward the roller 44. Interposed between the rollers 43 and 44 is the tapered end 48 of a positioning shaft 49 of a fine positioner 50. The positioner 50 is bolted to a suitable supporting portion of the positioner support 14.

The fine positioner 50 may be of the same construction as the coarse positioner 34 previously described, and may conveniently have ten operating positions spaced apart the same distance as those of the coarse positioner. For example, ten positions 0.2 inch apart have been employed. However, in view of the small angle of taper of the projection 48 on the output shaft 49 it will be apparent that an increment of movement of the output shaft 49 will result in a smaller increment of movement of the roller 43 and shaft 30 with respect to the roller 44. Conveniently, for reasons described in detail in copending U.S. application Serial No. 273,694 filed April 17, 1963, by Byron D. Smith for Head Positioning Apparatus for Random Access Disc Memory Systems, the ratio of the movement of the shaft 49 to the corresponding movement of the arm 30 is chosen as $1/11$, where the increment of movement of the output shaft 49 at each step is equal to the increment of movement of the output shaft 33 of the coarse positioner 34 at each step. It will be apparent that by a combination of settings of the positioners 34 and 50, any one of one hundred spaced positions of the arms 11 may be selected.

Figure 5:
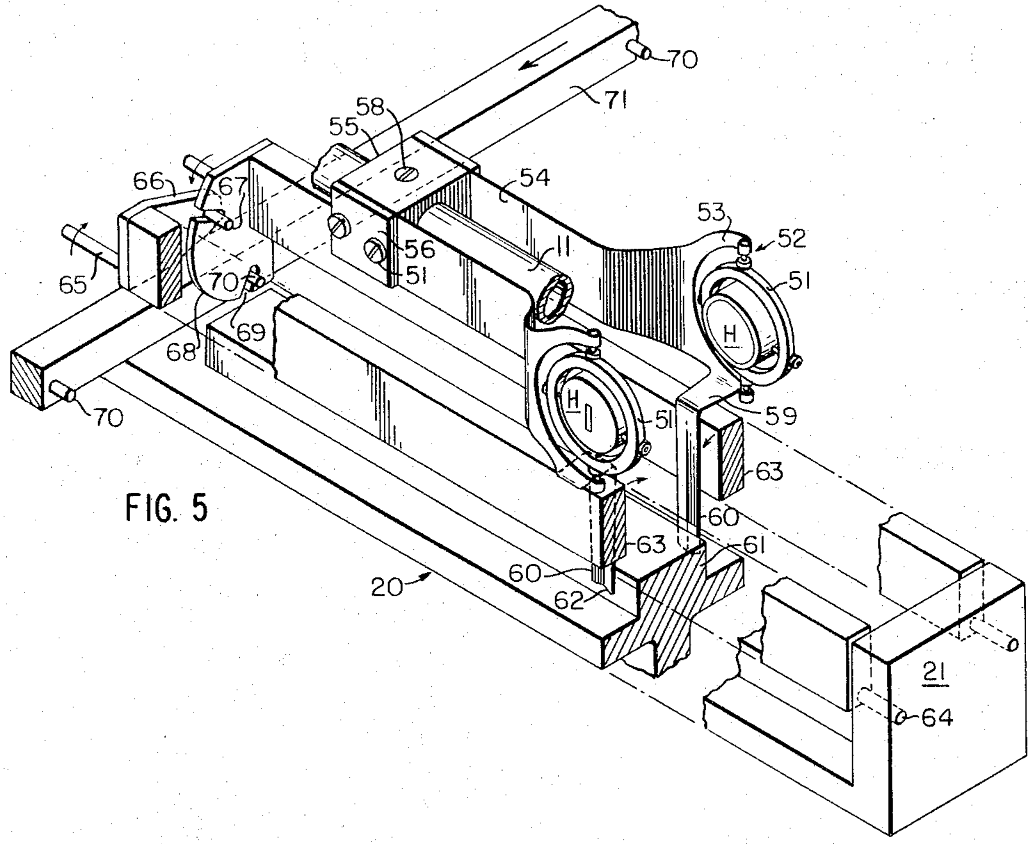
FIG. 5 is a perspective view of a typical portion of the head mounting and positioning apparatus of our invention.

Referring next to FIG. 5, the manner in which the heads H are mounted on the arms 11 will next be described in more detail. As shown in FIG. 5, each of the heads H is pivotally mounted in a gimbal ring 51 for rotation about a first axis. The gimbal ring 14 is in turn pivoted for rotation about an axis normal to the first axis. The gimbal 51 is journalled in the manner generally indicated at 52, in suitably shaped projections 53 forming part of a supporting spring 54. The spring 54 is secured at one end to a support block 55, by suitable means such as a plate 56 and screws such as 57. The support block 55 is secured to the arm 11 by a set screw 58.

Formed on each of the springs 54 is an inwardly extending projection 59, followed by a downwardly extending projection 60, which engages a ledge 61 formed on the associated spoiler 20.

Figure 3:
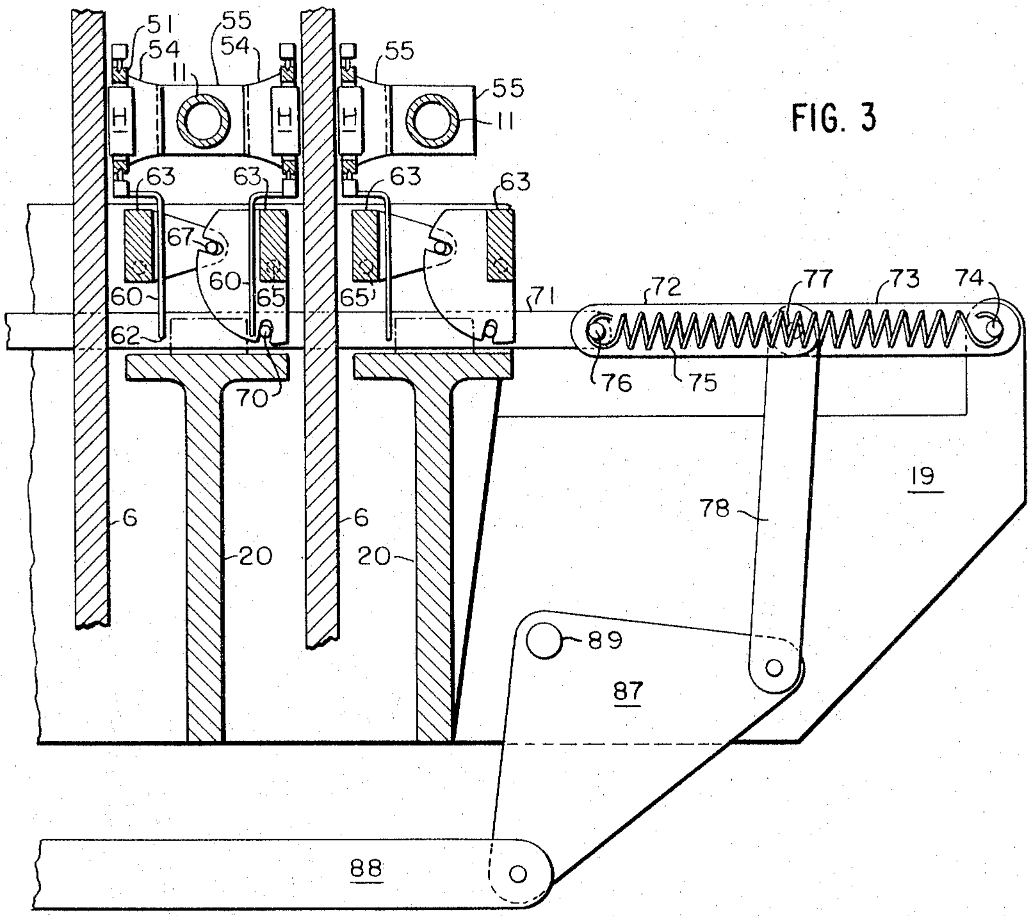
FIG. 3 is a fragmentary cross-sectional elevation, on an enlarged scale, of the apparatus of FIGS. 1 and 2, taken essentially along the lines 3—3 in FIG. 2.
Figure 4:
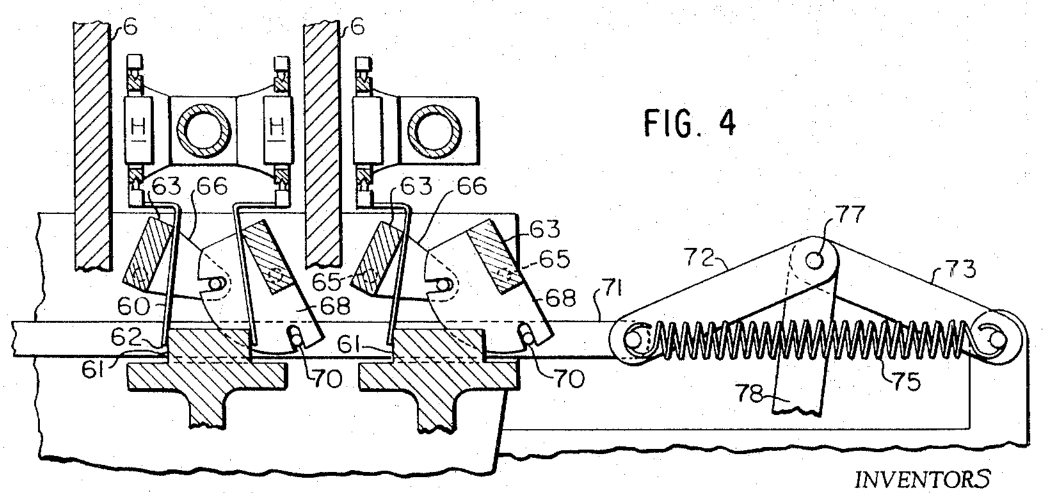
FIG. 4 is a fragmentary view similar to FIG. 3 with parts removed, and showing the apparatus with the heads in retracted position.

Pivoted for limited rotation about axes parallel to the axes of the arms 11 are a series of retraction bars 63. Each arm 11 has associated with it two retraction bars 63, one on either side of the arm. Each retraction bar 63 cooperates with the heads mounted on the arm on the associated side of the arm, and serves at times to force the heads H away from the surface of the discs. As best shown in FIGS. 1 and 3, the retraction bars 63 are provided at each end with a pivot pin such as the pivot pins 64 and 65. The pin 64 of each arm is journalled in the corresponding upstanding ledge 21 of the spoiler 20, whereas the pin 65 is journalled in the spoiler support plate 19. As shown in FIGS. 3, 4 and 5, each pair of retraction bars 63 is interconnected by a linkage by means of which the bars can be simultaneously actuated to retract the heads. One of each pair of bars 63 has secured to it for this purpose an arm 66, upon which is secured a crank pin 67. This crank pin cooperates with a slot formed in an arm 68, secured to the other retraction bar 63.

A second slot 69 formed in the arm 68 is adapted to receive an actuating pin 70 carried by an actuating bar 71. In FIG. 3, the actuating bar 71 is shown in an extreme leftward position, in which the retraction bars 63 are out of engagement with the spring projections 60. In FIG. 4, the actuating bar 71 is shown in an extreme rightward position, in which each pair of retraction bars 63 is rotated to engage the projection 60 and retract the heads H from the surfaces of the discs 6.

The position of the actuating bar 71 is controlled by a toggle joint comprising a pair of links 72 and 73. The link 72 is rotatably connected to the link 71 by a pin 76 and to the link 73 by a pin 77, and the link 73 is rotatably connected at its opposite end to a pin 74 secured to the spoiler support plate 19. A spring 75 interconnects the pin 74 and the pin 76, tending to assist in collapsing the linkage, as shown in FIG. 4, when the links 72 and 73 are brought out of line.

Figure 6:
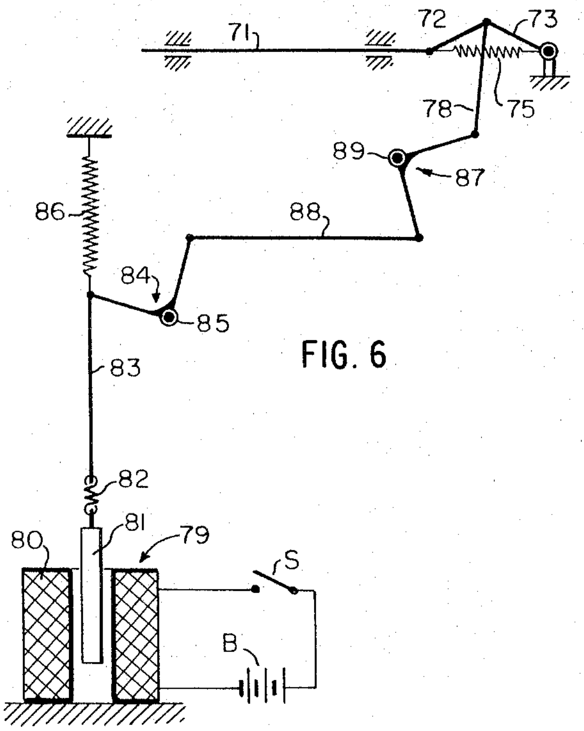
FIG. 6 is a diagrammatic view of the linkage employed to actuate the head retraction mechanism of our invention.

The pin 77 joining the links 72 and 73 is secured to an actuating link 78. The actuating link 78 is controlled by a solenoid generally indicated at 79 in the manner shown schematically in FIG. 6. Referring to FIG. 6, the solenoid 79 comprises a coil 80 adapted to be energized by any suitable source of voltage such as a battery B when a switch S is closed.

The armature 81 of the solenoid 79 is connected by means of a spring 82 and a link 83 to one arm of a bell crank 84. The bell crank 84 is journalled on the positioner support 14 by means of a pin 85. A spring 86, connected between the link 83 and the positioner support, urges the armature 81 upwards in FIG. 6, and energization of the coil 80 will urge the armature downward.

The ball crank 84 is connected to one arm of a second bell crank 85 by means of a link 87. The second bell crank 87 and the bell crank 84 are interconnected by an arm 88, rotatably secured to each crank. The bell crank 87 is pivoted to the positioning support at 89. The other arm of the bell crank 87 is rotatably connected to the actuating link 78.

The spring 82 is made stronger than the other springs in the linkage, but still not beyond the power of the solenoid 79 to extend. The purpose of this construction is to allow the armature 81 of the solenoid 79 to move immediately to its engaged position, in which it can be strongly held, even though the inertia of the linkage causes it to follow more slowly. In this manner, an extremely rapid and positive actuation of the actuating bar 71 can be obtained.

Upon energization of the solenoid 79, it will be apparent that the actuating bar 71 will be rapidly returned to its position in which the heads H are lowered into operating relationship with the discs 6, by means of the springs 75 and 86.

The heads should not be placed in operating position until the discs are spinning at operating speed. At operating speed, the boundary layer of air between the surface of the discs 6 and the heads H maintain them a slight but safe distance away from the surface of the discs so that contact is not made.

The operation of the apparatus of our invention will be apparent from the above description of the structure of the preferred embodiment thereof. Briefly, operation is begun with the switch S open and the linkage for retracting the heads in the position shown in FIG. 4, which is the position assumed when the solenoid 79 is de-energized. The motor M is first started, and the disc 6 brought up to operating speed, which in practice may conveniently be about 1200 r.p.m. The switch S may then be closed to energize the solenoid 79 and move the actuating bar 71 to place the retraction bars 63 in the position shown in FIG. 3, in which the heads H fly over the surface of the associated discs 6.

When it is desired to move the heads H to a selected position, the positioning means 34 and 50 may be simultaneously energized to desired positions. Actuation of the positioning means 34 adjusts the tape 25 to one of ten positions, and a further fined adjustment to one of ten positions within the range defined by the distance between the coarse positions is simultaneously imparted by movement of the shaft 49 of selected distance apart. The arm 30 is thus carried to one of ten fine positions, and the bracket 13 carrying the arms 11 is moved by the tape 25 to the selected track.

While we have described only one embodiment of our invention in detail, many changes and variations will be apparent to those skilled in the art upon reading our description, and such can obviously be made without departing from our invention.

Having thus described our invention, what we claim is:

1. In combination with a pair of spaced parallel recording discs journalled on a support for rotation about a common central axis, an arm extending radially between said discs along a second axis parallel to the discs, means slidably mounting said arm on said support for radial movement between said discs, two transducer heads, spring means for resiliently mounting said heads on opposite sides of said arm in positions adjacent confronting recording surfaces of said discs, said spring means comprising depending portions extending normal to the second axis, a pair of retraction bars located on opposite sides of the depending portions, pivoted for rotation about axes parallel to said second axis, and rotatable between a first position engaging said depending portions to force said heads away from the surfaces of the discs and a second position disengaged from the depending portions, and linkage means interconnecting said retraction bars for selectively and simultaneously rotating them between their first and second portions.

2. In combination, a base member, a magnetic recording disc rotatably mounted on said base member for rotation about a first axis, a support arm extending along one surface of said disc, a second arm extending along a radius of said disc and parallel thereto, means connected to said support arm for slidably supporting said second arm at both ends for linear movement radially of said disc, a transducer head, a spring connecting said head to said second arm and resiliently supporting it in proximity to said disc, said spring having a depending portion extending transversely of said second arm into proximity with said support arm, a projection on said support arm located in the path of movement of said depending portion away from said disc, a retraction bar rotatably mounted adjacent said depending portion for movement between a first position engaging said depending portion between said second arm and said projection and urging said head away from said disc and a second position disengaged from said depending portion, and means for selectively rotating said retraction bar to a selected one of its positions.

3. Apparatus of the class described, comprising, in combination, a recording disc mounted on a support for rotation about its central axis, a tubular arm extending beside said disc along a radius thereof and parallel thereto, means for slidably supporting said arm for translation radially of said disc comprising a guide rod extending into said tubular arm at one end and fixed to said support and means slidably mounted on the support and secured to the tubular arm at its other end, and a transducer resiliently mounted on the tubular arm for movement therewith, said transducer being located in operative proximity to the surface of the disc.

4. In combination with a plurality of spaced parallel recording discs journalled on a support for rotation about a common central axis, a plurality of support arms mounted on said support and extending radially, one between each adjacent pairs of discs, an inner guide rod mounted on each support arm between the discs and having a longitudinal axis parallel to a radius of each adjacent disc, two outer guide rods having longitudinal axes parallel to the longitudinal axes of said inner guide rods and mounted on said support outside of said discs, a bracket slidably mounted on said outer guide rods, a tubular arm for each inner guide rod mounted at one end on said bracket and slidably receiving the inner guide rod for guidance and support at its other end, said tubular arms having longitudinal axes coincident with the longitudinal axes of their associated inner guide rods, at least two transducer heads mounted on each arm, on opposite sides thereof and each confronting a recording surface of a different one of the adjacent discs, and means for moving said bracket to a selected position to locate the heads adjacent selected tracks on said discs.

5. Head retraction means for a series of transducer heads resiliently mounted in opposed pairs on opposite sides of an arm adapted to extend along a first axis between spaced parallel recording surfaces, comprising a member operatively connected to each head and extending therefrom in a direction transverse to said first axis, a retraction bar adjacent each member and having a first position engaging the member and moving it toward the arm and a second position out of contact with the member, and means interconnecting the retraction bars for simultaneous actuation to a selected one of their positions.

6. In combination with a series of spaced parallel recording discs journalled on a first support for rotation about a common central axis, a second support journalled on said support for rotation between first and second positions, a plurality of support arms mounted on said second support and extending between the discs in said first position and away from the discs in said second position, an arm slidably mounted on each support arm for movement radially of the discs in said first position, and at least one transducer head resiliently mounted on each arm and located in operative proximity to the recording surface of a disc in said first position.

7. The apparatus of claim 6, further comprising retraction means mounted on said second support for simultaneously retracting said head away from said discs when actuated, and manually controlled means for actuating said retracting means.

8. In combination, a transducer mounting arm extending along a first axis and slidably mounted on a support for translation along said axis, first and second retraction bars pivotally mounted about axes parallel to said first axis, first and second spring means mounted on opposite sides of said mounting arm, each spring means comprising an element extending between said retraction bars, each retraction bar comprising a portion engaging a different one of said extending elements in a first rotated position of the bar to urge said spring means toward said mounting arm, said portion being disengaged in a second rotated position of the bar, linkage means interconnecting the bars for simultaneous rotation into or out of engagement with said elements, third spring means connected to said linkage means for urging said retraction bars to their second positions, and electromechanical means connected to said linkage means and operable to move said retraction bars to their first positions against the force exerted by said third spring means.

9. Apparatus of the class described, comprising, in combination, a plurality of spaced parallel recording discs mounted on a support for rotation about a common central axis, at least one spoiler arm cantilevered in said support radially outwardly of said discs and extending between adjacent ones of said discs with clearance, at least one arm extending radially between said adjacent discs, at least one transducer head mounted on said arm for cooperation with a recording surface of one of said discs, and means for slidably supporting said arm for rectilinear translation radially of said discs to locate said head adjacent a selected track of said disc, said arm-supporting means comprising a guide rod mounted in an end of said spoiler adjacent said common axis and slidably supporting a radially inner end of said arm, and means slidably mounted on said support radially outwardly of said discs and supporting the radially outer end of said arm.

10. In combination with a plurality of spaced parallel recording discs journalled on a support for rotation about a common central axis, a plurality of spoiler arms cantilevered in said support radially outwardly of said discs and extending, one between each adjacent pair of discs toward said common axis, a plurality of inner guide elements each mounted on a spoiler arm between adjacent discs and having a longitudinal axis parallel to a radius of each adjacent disc, at least one outer guide element mounted on said support and having a longitudinal axis thereof parallel to the longitudinal axes of said inner guide elements and mounted on said support radially outwardly of said discs, a bracket slidably mounted on said outer guide element for movement parallel to the axis thereof, a plurality of arms each extending between an adjacent pair of said discs, and slidably mounted upon one of said inner guide elements at a radially inner end thereof, an outer end of each of said arms being mounted on said bracket and thereby being slidably supported at either end for movement parallel to the axes of said guide elements, at least two transducer heads mounted on each arm in operative juxtaposition to a recording surface of a different one of the adjacent discs, and means for moving said bracket to a selected position to locate the said heads with respect to said discs.

References Cited by the Examiner

UNITED STATES PATENTS

| | | | |
|---|---|---|---|
| 3,009,759 | 11/1961 | Johnson et al. | 346—74 |
| 3,124,789 | 3/1964 | Wasylenko | 340—174.1 |

JAMES W. MOFFITT, *Acting Primary Examiner.*

A. I. NEUSTADT, *Assistant Examiner.*